Feb. 8, 1966     A. B. BASSOFF     3,233,331
UNIVERSAL INVOLUTE CHECKER
Filed Nov. 29, 1962     2 Sheets-Sheet 1
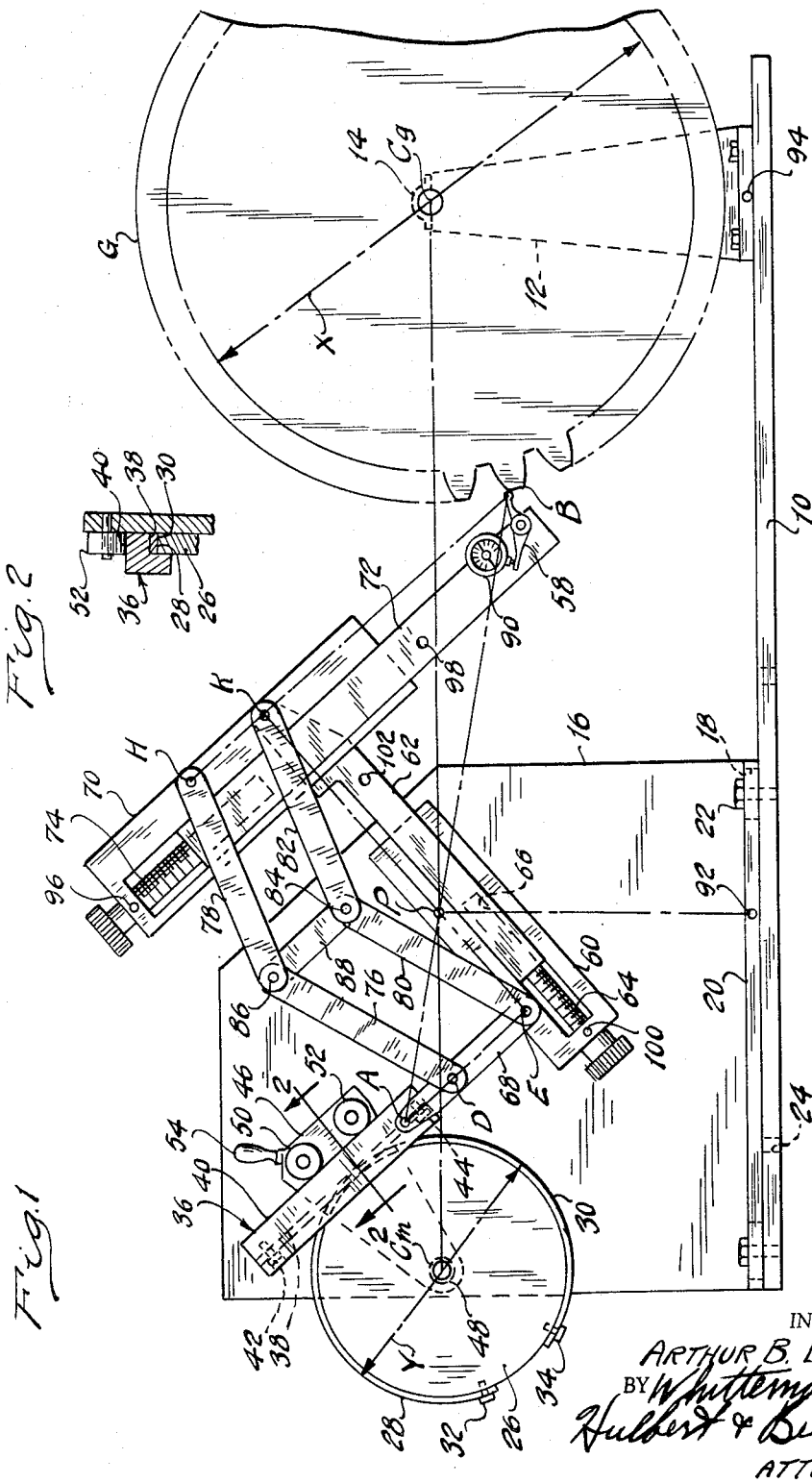
INVENTOR.
ARTHUR B. BASSOFF
BY Whittemore,
Hulbert & Belknap
ATTORNEYS.

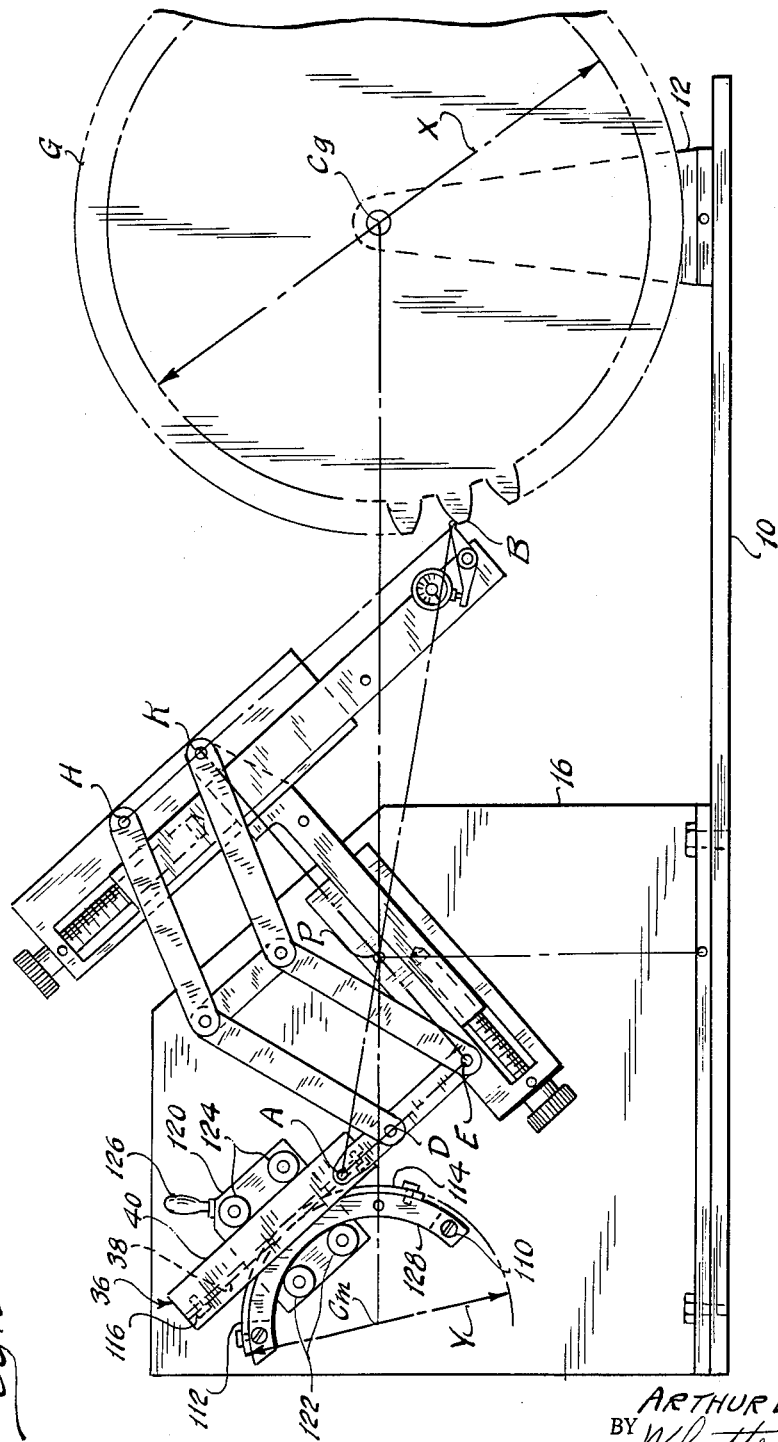

United States Patent Office 3,233,331
Patented Feb. 8, 1966

3,233,331
UNIVERSAL INVOLUTE CHECKER
Arthur B. Bassoff, Detroit, Mich., assignor to National Broach & Machine Company, Detroit, Mich., a corporation of Michigan
Filed Nov. 29, 1962, Ser. No. 240,996
2 Claims. (Cl. 33—179.5)

The present invention relates to a universal involute checker and more particularly to a checker adapted to measure the involute profile of gear teeth.

It is an object of the present invention to provide an involute checker of the character described which requires no profile templets or cams.

It is a further object of the present invention to provide a tooth involute profile checker which checks the involute from the theoretical base circle of the work gear.

It is a further object of the present invention to provide an involute checker for a gear which is not affected by spacing or lead errors in the work gear.

It is a further object of the present invention to provide an involute profile checker including a pantograph mechanism for establishing and maintaining a required proportional relation between a master cylindrical surface and the base circle of the work gear.

It is a further object of the present invention to provide a gear checker including a pantograph characterized by a double folding linkage which provides for variation of ratio of the pantograph by simple screw adjustment means.

It is a further object of the present invention to provide an involute profile checker which employs a small sector of a very large master cylinder to improve accuracy.

It is a further object of the present invention to provide, for use in an involute profile checker, an involute generator including a bar adapted to roll without slipping on a portion of a master cylinder.

It is a feature of the present invention to provide an involute generator including a master cylindrical surface, a pair of opposing tapes connected to said surface and extending in overlapping relation on said surface, a bar having a planar surface adapted to engage and roll on the outer surfaces of both of said tapes, said tapes being attached under tension to spaced portions on said bar.

It is a further feature of the present invention to provide an involute generator, as described in the preceding paragraph, in combination with a bar support mounted for movement in an arcuate path about the center of curvature of the master cylindrical surface, said bar support having roller means thereon engaging a planar surface on the bar opposite and parallel to the planar surface of the bar which is in rolling engagement with the outer surface of said tapes.

Other objects and features of the invention will become apparent as the description proceeds, especially when taken in conjunction with the accompanying drawings, illustrating a preferred embodiment of the invention, wherein:

FIGURE 1 is an elevational view of the involute checker.

FIGURE 2 is a fragmentary section on the line 2—2 of FIGURE 1.

FIGURE 3 is a view similar to FIGURE 1 of a somewhat different embodiment of the involute checker.

The involute checker constructed in accordance with the present invention is capable of checking involute profiles on gear teeth and the like and is adjustable so that the same instrument can check involutes of widely differing diameters of base circle without requiring a plurality of templets, cams or the like. Moreover, the involute checker is designed to permit the use of a relatively small segment of a relatively large master cylinder so that the overall accuracy of the instrument is improved.

While the involute checker disclosed herein may be made in any convenient size, it is particularly useful as applied to the measurement of the involute profiles of teeth of relatively large and massive gears.

Referring now to FIGURES 1 and 2, the involute checker comprises a base 10 carrying a pedestal 12 including means indicated generally at 14 for supporting a work gear G. The work gear may be rotatable on the pedestal 12 but during the checking of the involute of the teeth of the gear G, the gear is retained against rotation by suitable means not shown. Mounted on the base 10 is stand 16 supporting the involute checking unit. Stand 16 is adjustable toward and away from the gear G and toward the base 10, the adjustment being diagrammatically illustrated as provided by elongated slots 18 in the mounting flange 20 and screws 22 adapted to be received in the appropriate ones or a plurality of tapped openings 24.

Mounted in fixed relation on the stand 16 is a master cylinder 26 having a pair of oppositely extending tapes 28 and 30 secured thereto by screws 32 and 34 respectively. The tapes are of identical thickness and extend in opposite directions from the screws 32 and 34 about the cylindrical peripheral surface of the master cylinder 26. Associated with the master cylinder 26 is a generating bar 36, the bar having the cross sectional shape illustrated in FIGURE 2 and being provided with a planar tape engaging surface 38 and a back surface 40 which is parallel to the planar tape engaging surface 38.

The tape 30 has an end portion secured to the surface 38 by a screw 42 and the tape 28 has an end secured to the surface 38 by a screw 44. The tapes 28 and 30 are tensioned so that the inner surfaces thereof conform precisely with the outer cylindrical surface of the master cylinder 26 and such that the surface 38 is pressed against and is adapted to roll without slipping along the outer cylindrical surface formed by the outer surfaces of the tapes 28 and 30, all as best seen in FIGURE 2.

In order to retain the surface 38 of the generating bar 36 firmly against the outer surfaces of the tapes 28 and 30, there is provided a movable actuator 46, which in this embodiment of the invention is in the form of an arm pivoted at one end as indicated at 48, for swinging movement about the axis of curvature of the master cylinder 26. The actuator comprises a pair of rollers 50 and 52 which are adapted to press against the planar back surface 40 of the bar 36. The actuator includes a finger piece 54 by means of which the operator may swing the actuator in an arc about the axis of its pivot mounting 48. This in turn will rock the bar 36 about the cylindrical surface defined by the outer surfaces of the tapes 28 and 30. The tapes positively prevent endwise slippage of the bar on the generating cylinder and the rollers 50 and 52 retain the bar firmly against relative displacement.

From the foregoing it will of course be apparent that the bar 36 rolls around a generating cylinder having a diameter Y and that in accordance with well-understood geometric principles, any point on the surface 38 of the bar moves in an involute path in which the base circle of the involute has the diameter Y.

Mounted on the bar 36 is a connector, such for example as the pin A, whose axis occupies the plane of the planar surface 38. As the bar 36 is caused to roll on the cylindrical surface defined by the outer surfaces of the tapes 28 and 30, the axis of the pin A traces an involute of the base diameter Y.

In order to check the involute profile of a tooth of the gear G there is provided a pantograph device including means embracing the pin A and hence movable therewith in a predetermined involute path, and an involute follower in the form of a pivoted lever 58 which will subsequently be described.

The pantograph is adapted to be adjustable as to ratio by simple adjusting means including a pair of screws. Essentially the pantograph comprises a base bar assembly connecting the points E and K, the assembly comprising a bar element 60 and an adjustable extension bar 62. The bar element 60 carries a rotatable adjusting screw 64 which is retained against axial displacement and the screw is threaded into a tapped recess 66 in the end of the slidably associated extension 62.

Pivoted to the bar element 60, as indicated at E, is a bar 68, the end of the bar 68 including means for connection to the pin A. The extension 62 has a second bar 70 pivotally connected thereto by pivot means indicated at K. Bar 70 includes a slidable extension 72 adapted to be moved longitudinally of the bar 70 by a threaded adjusting screw 74 mounted for rotation but held against axial displacement relative to the bar 70.

Interconnecting the bars 68 and 70 is a parallel linkage mechanism comprising links 76, 78, 80 and 82. Link 80 is pivoted at one end to the pivot connection E which also connects the bar 68 to the bar element 60. Link 82 is pivotally connected at one end to the pivot connection K which connects the second bar 70 to the base bar extension 62. The other ends of the links 80 and 82 are pivotally interconnected by a pivot pin 84. The link 76 is pivotally connected at one end to a pivot mounting D on the bar 68 and the link 78 is pivotally connected at one end to the pivot mounting H on the second bar 70. The other ends of links 76 and 78 are pivotally interconnected by a pivot pin 86. Also connecting pivot pins 84 and 86 is a link 88 whose length is exactly equal to the distance between pivots D and E and also between pivots H and K. With the arrangement as described, the linkage including links 76, 78, 80, 82 and 88 operate to maintain bars 68 and 70 in exact parallellism irrespective of the position of adjustment of the extension 62 relative to the base bar element 60.

A main pivot mounting P is provided which connects the base bar element 60 to the stand 16. Mounted on the projecting end of the extension 72 of the bar 70 is the movable lever 58 to which reference was previously made. Lever 58 includes a spherical head, the center of which is designated B. Mounted on the extension 72 is a measuring means here illustrated as a dial indicator 90, although of course it will be appreciated that the measuring element may be electrical in nature, such for example as a linear variable displacement transformer.

The geometry of the pantograph, as will presently be described, is such that as the point A is caused by the involute generating mechanism to move in the path of an involute of base circle diameter Y, the point B which is the center of the ball head of the lever 58 will move the path of an involute of a base circle diameter X. Any deviation from a true involute on the tooth of the gear G will accordingly be determined by the measuring device 90.

The ratio of the pantograph mechanism is BP/AP. Therefore when the ratio BP/AP is equal to the ratio X/Y (the ratio between the diameters of the involute base circles) the point B will describe an involute of the base circle diameter X. The dimension from the center Cm of the master cylinder 26 to the main pivot point P is fixed. Generally the dimensions AE and EP are fixed. The distance from the main pivot P to the axis of the gear Cg (PCg) may be adjusted by adjusting the involute checker support stand 16 on the base 10. In order to determine the adjustment with greater accuracy, gauge pins 92 and 94 are provided. The dimension BK is adjustable by adjusting the extension 72 longitudinally of the bar 70 by rotation of the screw 74 and this adjustment may be made very accurately by use of the gauge pins 96 and 98. The dimension PK is adjustable by adjusting the extension 62 relative to the base bar element 60 by rotation of screw 64. This last adjustment may be determined with greater accuracy by use of the gauge pins 100 and 102.

It will further be observed that the main pivot point P of the pantograph device lies on the line CmCg so that the involute traced by the point A and the involute traced by the point B will have the same orientation relative to their respective base circles.

While a very substantial range of gear size may be checked with extreme accuracy as shown, it will be understood that different ranges of adjustment as to base diameters of work gears may be provided by substituting differently sized base cylinders 26 or alternating by providing a plurality of different pivot mountings along the line CmCg adapted to receive the pivot pin P.

Referring now to FIGURE 3 where like parts are identified by like reference characters, there is shown an arrangement in which only a small segment of a base circle is required. With this arrangement, it will be understood that the diameter of the involute generating cylinder Y may be as large as desired since it is not necessary to locate the center of curvature thereof within the illustrated mechanism.

In this figure there is shown a segment 110 of a base cylinder, the imaginary center of which is designated Cm. As previously indicated it is not necessary that the center Cm occupy the position shown or in fact be anywhere within the confines of the structure illustrated in FIGURE 3 so long as it occupies the line CgCm.

With this construction, tension opposed tapes 112 and 114 are provided on the outer cylindrical surface of the segment 110 and the opposite ends thereof are fastened by screws, such as shown at 116, to the planar generating surface 38 of the bar 36.

In this case the bar actuating member comprises a block 120 having a pair of inner rollers 122 and a pair of outer rollers 124 thereon. The block is provided with a finger piece 126 by means of which the operator may cause the block to travel in an arcuate path about the imaginary center of the cylinder segment 110. With the tapes 112 and 114 tensioned and rollers 122 and 124 bearing respectively against the inner cylindrical surface 128 of the segment 110 and the back planar surface 40 of the bar 36, movement of the bar actuator results in true rolling of this bar about the generating cylindrical surface defined by the outer cylindrical surfaces of the tapes 112 and 114 and thus generating point A is forced to move in a path which is an involute of the base circle Y.

The remaining structure of the device illustrated in FIGURE 3 may be identical of that shown in FIGURE 1. It will however be understood that while the arcuate segment 110 is illustrated as having an outside diameter not substantially different from the outside diameter of master cylinder 26 of FIGURE 1, the segment may in practice be of a diameter many times greater than illustrated and in fact as much larger than the diameter X of the base circle of the gear G as desired. By thus using a very accurate, very large cylindrical surface of a master cylinder, improved accuracy to movement of the point B may be derived.

Again the ratio of the pantograph is continuously adjustable to the limits of adjustability provided and additional ranges may be further provided by the provision for adjustment of the main pivot mounting P longitudinally along the line CmCg on the plate 16.

The drawings and the foregoing specification constitute a description of the improved universal involute checker in such full, clear, concise and exact terms as to enable any person skilled in the art to practice the invention, the scope of which is indicated by the appended claims.

I claim:
1. An involute checker comprising a base, gear support means on said base for supporting a gear in fixed position during a checking operation, generating mechanism on said base for generating involutes of different base circles comprising a fixed member having an arcuate generating surface of predetermined radius, a bar having a rectilinear surface, tapes connected between said bar and member to prevent slippage as said bar is rocked about the arcuate surface of said member, adjustable parallel linkage constituting an adjustable pantograph pivotally mounted on said base adjacent said bar, pivot means connecting said pantograph to said bar at a point thereon movable in a path which is an involute of a base circle equal in diameter to the diameter of the arcuate generating surface as said bar is rocked about the axis of said fixed member, said pantograph having a movable support, a contact element on said support normally movable therewith in a path which is an involute of a base circle whose diameter depends on the ratio adjustment of said pantograph, said contact element being movable relative to said support, means for sensing movement of said element relative to said support, means for relatively adjusting a gear on said gear support and said generating mechanism to position said contact element on a tooth surface of the gear for movement in an involute path corresponding to the correct involute surface of such tooth, and means for rocking said bar relative to said member and pivoting said pantograph on said base to move said contact element in the required involute path.

2. An involute checker comprising a base, gear support means on said base for supporting a gear in fixed position during a checking operation, generating mechanism on said base for generating involutes of different base circles comprising a fixed member having an arcuate generating surface of predetermined radius, a bar having a rectilinear surface, tapes connected between said bar and member to prevent slippage as said bar is rocked about the arcuate surface of said member, said bar having a second rectilinear surface parallel to its first mentioned rectilinear surface, an arm pivoted at the center of curvature of said arcuate surface, a pair of rollers on said arm engaging said second rectilinear surface, adjustable parallel linkage constituting an adjustable pantograph pivotally mounted on said base adjacent said bar, pivot means connecting said pantograph to said bar at a point thereon movable in a path which is an involute of a base circle equal in diameter to the diameter of the arcuate generating surface as said bar is rocked about the axis of said fixed member, said pantograph having a movable support, a contact element on said support normally movable therewith in a path which is an involute of a base circle whose diameter depends on the ratio adjustment of said pantograph, said contact element being movable relative to said support, means for sensing movement of said element relative to said support, means for relatively adjusting a gear on said gear support and said generating mechanism to position said contact element on a tooth surface of the gear for movement in an involute path corresponding to the correct involute surface of such tooth, and means for rocking said bar relative to said member and pivoting said pantograph on said base to move said contact element in the required involute path.

References Cited by the Examiner
UNITED STATES PATENTS

| | | | |
|---|---|---|---|
| 1,395,582 | 11/1921 | Kavle | 33—179.55 |
| 2,642,660 | 6/1953 | De Vau | 33—23 |
| 2,652,665 | 9/1953 | Jessup | 33—179.55 |
| 2,673,401 | 3/1954 | Bradner | 33—179.55 |
| 2,690,082 | 9/1954 | Orcutt | 74—95 |
| 2,706,913 | 4/1955 | Trossi | 74—95 |
| 2,770,048 | 11/1956 | Ernst | 33—179.55 |
| 2,800,721 | 7/1957 | Kopec | 33—179.55 |
| 2,855,678 | 10/1958 | Hofer | 33—27 |

ISAAC LISANN, *Primary Examiner.*

LEONARD FORMAN, LOUIS R. PRINCE, *Examiners.*